United States Patent
Kenjyo et al.

(10) Patent No.: US 8,044,703 B2
(45) Date of Patent: Oct. 25, 2011

(54) DIVERSITY SIGNAL PROCESSING SYSTEM AND A PRODUCING METHOD THEREOF

(75) Inventors: Hiroaki Kenjyo, Kanagawa (JP); Tadashi Miyazaki, Kanagawa (JP); Yasushi Goto, Kanagawa (JP); Naotaka Oda, Kanagawa (JP); Toshifumi Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1052 days.

(21) Appl. No.: 12/109,091

(22) Filed: Apr. 24, 2008

(65) Prior Publication Data
US 2009/0315614 A1 Dec. 24, 2009

(30) Foreign Application Priority Data
Apr. 26, 2007 (JP) .................. 2007-116403

(51) Int. Cl.
*G06F 11/16* (2006.01)
(52) U.S. Cl. ...................... 327/526; 327/403
(58) Field of Classification Search .................. 327/403, 327/526, 564, 565
See application file for complete search history.

(56) References Cited

U.S. PATENT DOCUMENTS
4,584,165 A * 4/1986 Wilson et al. .................. 376/216
5,930,317 A * 7/1999 Kono ............................. 376/259

FOREIGN PATENT DOCUMENTS
EP 1 727 157 A1 11/2006
JP 2005-249609 A 9/2005

* cited by examiner

*Primary Examiner* — Jeffrey Zweizig
(74) *Attorney, Agent, or Firm* — Foley & Lardner LLP

(57) ABSTRACT

Each of APRM units equipped for each of the diversity channels has printed circuit boards having circuit patterns thereon and a circuit description elements installed on the printed circuit board. The circuit description elements are FPGA elements manufactured by mutually different providers for example and implemented an electric circuit described in a hardware description language by a configuration tool. The circuit description elements can be implemented mutually different descriptions of the electric circuit, or can be implemented the electric circuit by mutually different configuration tools. Also, the printed circuit boards for the diversity channels can be different from each other.

11 Claims, 4 Drawing Sheets

DIVERSITY SIGNAL PROCESSING SYSTEM AND A PRODUCING METHOD THEREOF

CROSS REFERENCE TO RELATED APPLICATION

This application is based upon and claims the benefit of priority from the prior Japanese Patent Application No. 2007-116403 filed on Apr. 26, 2007; the entire content of which is incorporated herein by reference.

BACKGROUND OF THE INVENTION

The present invention relates to a diversity system provided with diversity channels, each of the diversity channels having a unit provided with a printed circuit board and a circuit description element in which an electric circuit described in a hardware description language is implemented. The present invention also relates to a producing method of such a system.

A digital signal processing approach using LSI, such as CPU or FPGA (Field Programmable Gate Array), may be applied to a radiation monitoring device of a safety protection instrumentation system for a nuclear plant. The digital signal processing can make it possible to deal with more complicated calculation, and has more accuracy and higher resistance to noise than an analog signal processing. Also, it becomes easier to make a system compact by applying the digital signal processing. Like these, there are many advantages in application of the digital signal processing. However, there also exists a disadvantage peculiar to the digital signal processing that an error may occur at a certain timing of signal processing or under a certain condition.

The safety protection instrumentation system has an important role on nuclear reactor protection. This role is represented by judging a scrum of the nuclear reactor at abnormalities and outputting a signal of scrum. Therefore, it is necessary to multiplex instruments and to be designed so as not to start an incorrect operation or not to remain incorrectly in non-operation. In order to apply the digital signal processing to such a safety protection instrumentation system, a quality assurance activity is necessary through a design phase and a manufacturing phase. Also it is necessary to validate the instruments by verifying and extracting causes of the above-mentioned incorrect operation and incorrect non-operation through the design phase or a pilot phase.

On the other hand, for the safety protection instrumentation system equipped with FPGAs can be constituted as a hard-wired logic. Consequently, as compared with a CPU based system where software mainly controls, the processing is decisive and the processing operation is also deterministic generally. Therefore, there is a merit of easy verification. However, since the digital signal processing is applied, the error resulting from the design logic error or the signal processing timing still exists. Therefore, a safety protection instrumentation system equipped with FPGAs which can eliminate those factors has been invented (for example, refer to Japanese Patent Application Publication 2005-249609; the entire content of which is incorporated herein by reference).

Generally, a safety protection instrumentation system is configured as a diversity system. About FPGA applied to such a safety protection instrumentation system, the means of verification of a design, an action, and a signal processing timing, etc. and validation have been proposed. However, as a potential problem, an artificial error in a design phase, a defect of an FPGA element, or a defect of FPGA configuration tools, such as, a logic synthesis tool of FPGA, can be a cause of malfunction common in the diversity system. If a cause of malfunction common to all diversity channels exists, each of the diversity channels may malfunction simultaneously because of the common cause, and the whole diversity system may malfunction.

BRIEF SUMMARY OF THE INVENTION

The present invention has been made to solve the above problems, and has an object to reduce possibility of malfunction of whole diversity system because of a cause common to diversity channels.

According to an aspect of the present invention, there is provided a redundant signal processing system having redundant channels, each of the redundant channels having a unit designed so as to satisfy a requirement that a given output signal is outputted in response to a given input signal, the unit comprising; a circuit substrate having a circuit pattern thereon; and a circuit description element installed on the circuit substrate, the circuit description element being implemented an electric circuit described in a hardware description language; wherein the redundant channels differ from each other in one of the circuit pattern of the channel and the circuit description element of the channel.

According to another aspect of the present invention, there is provided a method for producing a redundant signal processing system having redundant channels, each of the redundant channels having a unit designed so as to satisfy a requirement that a certain output signal is outputted in response to a certain input signal, the unit having a circuit substrate and a circuit description element installed on the circuit substrate, the circuit substrate having a circuit pattern thereon, the circuit description element being implemented an electric circuit described in a hardware description language, the method comprising; generating the circuit substrate and the circuit description element so that the redundant channels differ from each other in one of the circuit pattern and the circuit description element; and installing the circuit description element on the circuit substrate after the step of generating.

BRIEF DESCRIPTION OF THE DRAWINGS

The above and other features and advantage of the present invention will become apparent from the discussion herein below of specific, illustrative embodiments thereof presented in conjunction with accompanying drawings, in which.

DETAILED DESCRIPTION

Hereinafter, embodiments of a diversity system and a producing method thereof according to the present invention will be described with reference to the drawings. The same symbols are given to same or similar configurations, and duplicated descriptions may be omitted.

First Embodiment

Figure 1:
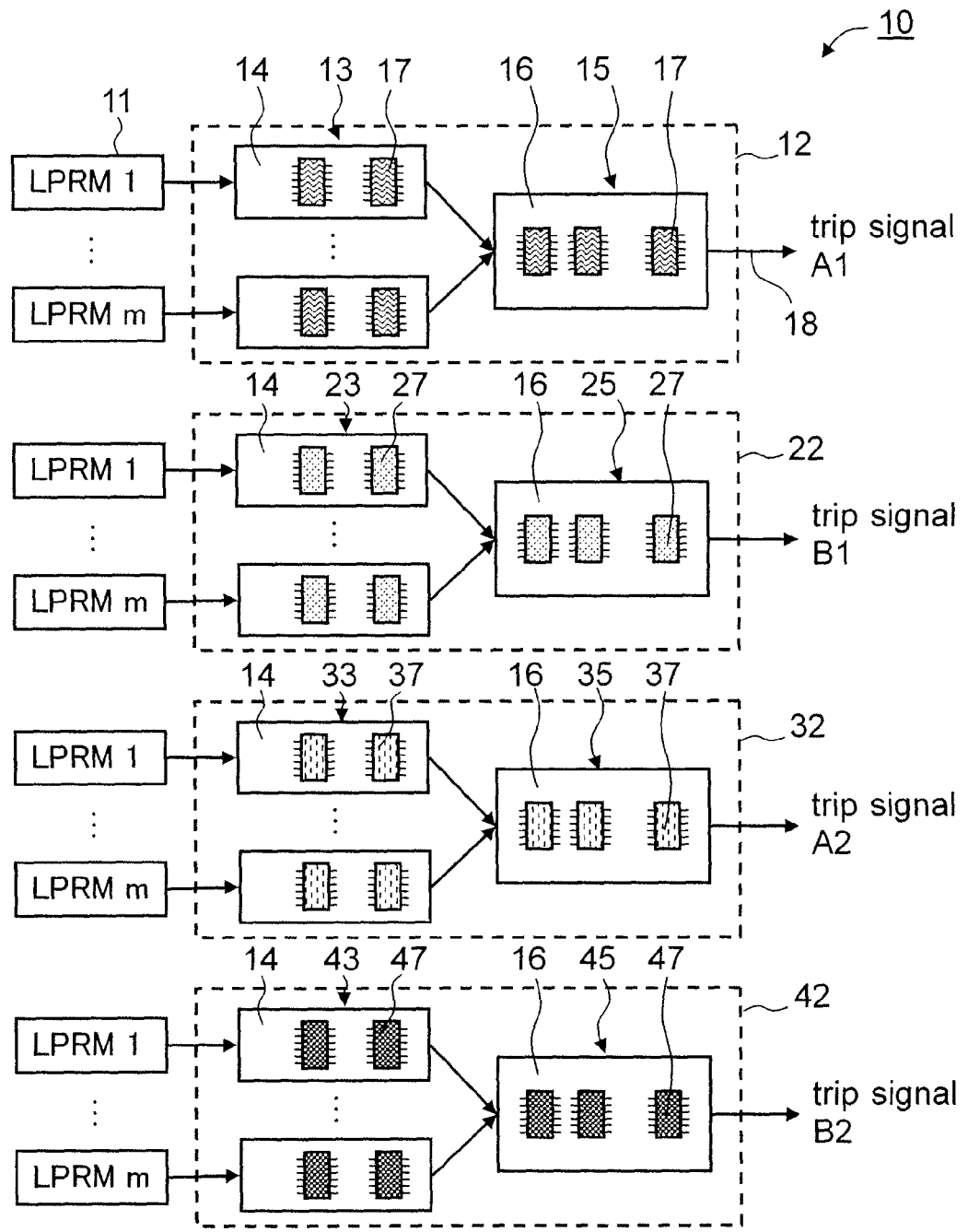
FIG. 1 is a block diagram of a first embodiment of a power range monitoring system according to the present invention.

FIG. 1 is a block diagram of a first embodiment of a power range monitoring system according to the present invention.

A power range monitoring system 10 has LPRM (local power range monitor) detectors 11. It also has APRM (average power range monitor system) units 12, 22, 32, 42 configured to perform a trip judgment based on the signal outputted from the LPRM detector 11. The number of LPRM detectors 11 is "m", for example. The number of APRM units 12, 22, 32, 42 is four, for example.

These APRM units 12, 22, 32, 42 are designed so as to satisfy requirements as outputting a given output signal in response to a given input signal. APRM units 12, 22, 32, 42 of this embodiment perform an averaging operation of the signals outputted from m LPRM detectors 11. The trip judgment of APRM units 12, 22, 32, 42 is carried out by judging whether the acquired average value exceeds a given threshold or not. If the trip judgment becomes "TRUE", each APRM unit 12, 22, 32, 42 outputs a trip signal 18 independently. Hereinafter, the trip signals 18 which four APRM units 12, 22, 32, 42 output are called trip signal A1, trip signal B1, trip signal A2, and trip signal B2, respectively.

A reactor protection system of a nuclear power plant scrums the nuclear reactor, if trip signal A1 or A2 is "TRUE" and trip signal B1 or B2 is "TRUE". Therefore, the design is multiplexed so that a nuclear reactor might not result in scrum with an incorrect trip signal, even if one of the APRM units 12, 22, 32, 42 falls into out of order. The reactor protection system may be configured to scrum the nuclear reactor if two or more out of four trip signals become "TRUE".

Thus, these APRM units 12, 22, 32, 42 are diversity channels.

Each of the APRM units 12, 22, 32, 42 has LPRM modules 13, 23, 33, 43. And each of the APRM units 12, 22, 32, 42 has an APRM module 15, 25, 35 or 45, for example. Each of the LPRM modules 13, 23, 33, 43 is provided with plurality of printed circuit boards 14. The LPRM module 13, 23, 33 or 43 is provided with circuit description elements 17, 27, 37 or 47, respectively, installed on the respective printed circuit board 14. Each of the APRM modules 15, 25, 35, 45 is provided with a printed circuit board 16. The APRM module 15, 25, 35 or 45 is provided with circuit description elements 17, 27, 37 or 47, respectively, installed on the respective printed circuit board 16. That is, each of the APRM units 12, 22, 32, 42 is provided with the printed circuit boards 14, 16 having a circuit pattern thereon, respectively, and the circuit description elements 17, 27, 37 or 47 installed on the printed circuit boards 14, 16. The circuit description elements 17, 27, 37, 47 are implemented electric circuits described in the hardware description language by a configuration tool. They may be FPGA elements, for example.

In this embodiment, the APRM units 12, 22, 32, 42 are different from each other in the circuit description elements 17, 27, 37, 47. For example, the different circuit description elements 17, 27, 37, 47 are FPGAs manufactured by the different provider (manufacturer). The FPGAs may be implemented a single VHDL (VHSIC Hardware Description Language) design by an FPGA configuration tool. The single VHDL design is described in the hardware description language so that an implemented FPGA element is configured to have an electric circuit that satisfies the requirements.

The circuit description elements 17, 27, 37, 47 manufactured by the different providers may be different from each other in a pin arrangement of the circuit description elements 17, 27, 37, 47. Therefore, this embodiment enables it to install these circuit description elements 17, 27, 37, 47 on same printed circuit boards 14, 16.

Figure 2:
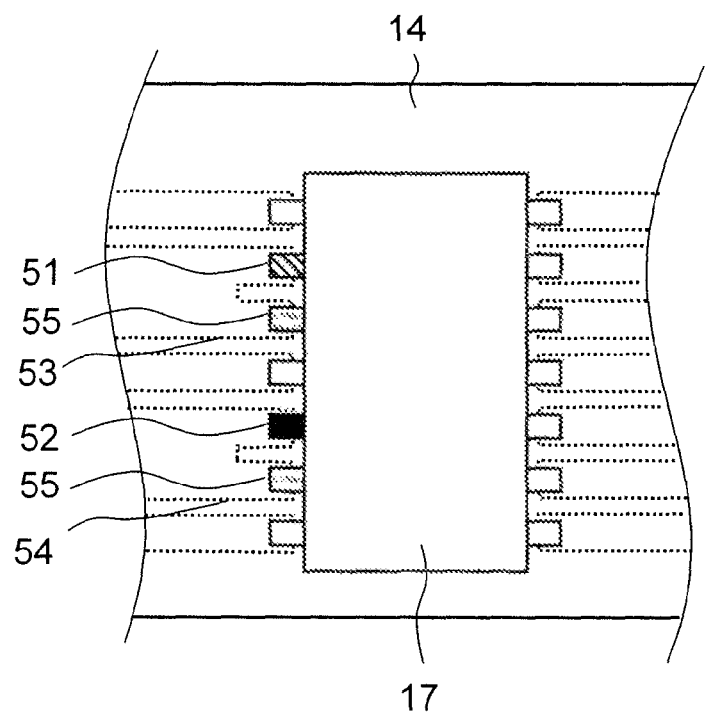
FIG. 2 is a top plan view of a printed circuit board equipped with a circuit description element manufactured by a first provider of the first embodiment of the power range monitoring system according to the present invention.
Figure 3:
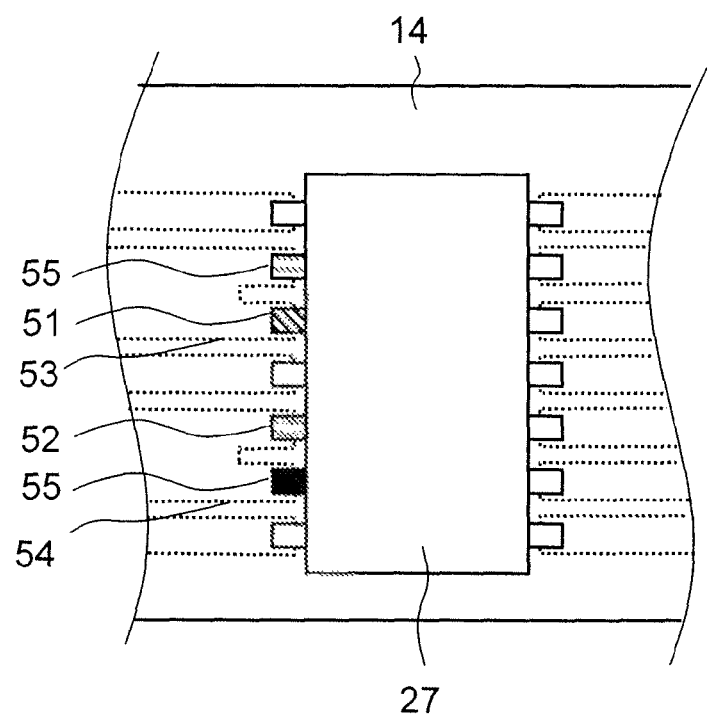
FIG. 3 is a top plan view of the printed circuit board equipped with a circuit description element manufactured by a second provider of the first embodiment of the power range monitoring system according to the present invention.

FIG. 2 is a top plan view of the printed circuit board equipped with a circuit description element manufactured by a first provider of the first embodiment of the power range monitoring system according to the present invention. FIG. 3 is a top plan view of the printed circuit board equipped with a circuit description element manufactured by a second provider of the first embodiment of the power range monitoring system according to the present invention. Although FIG. 2 and FIG. 3 indicate the printed circuit board 14 of the LPRM modules 13, 23, 33, 43, for example, the printed circuit boards 16 of the APRM modules 15, 25, 35, 45 are similar.

The circuit description element 17 manufactured by the first provider may have a different arrangement of fixed pins, such as a power supply (common pin 51 and ground pin 52) of circuit description elements 17, 27 from the circuit description element 27 manufactured by the second provider. Therefore, in order to use printed circuit boards 14 having a circuit pattern common to the four LPRM modules 13, 23, 33, 43, all the locations corresponding to the fixed pins in the circuit pattern of the circuit description elements 17, 27 are configured to be the locations where the fixed pins can be arranged.

In other words, for example, both of the location of the circuit pattern corresponding to the common pin 51 of one circuit description element 17 and the location of the circuit pattern corresponding to the common pin 51 of the other circuit description element 27 are configured to be a wiring 53 for the common pin 51. Also, both of the location of the circuit pattern corresponding to the ground pin 52 of one circuit description element 17 and the location of the circuit pattern corresponding to the ground pin 52 of the other circuit description element 27 are configured to be a wiring 53 for the ground pin 52. This means that the wiring for the common pin 51 and the wiring for the ground pin 52 are provided so that these wirings correspond to two pin positions respectively in the circuit pattern.

The electric circuit implemented in the circuit description elements 17, 27 should not be a configuration that a pin 55 of the circuit description elements 17, 27 corresponding to the fixed pin of the other circuit description element 27, 17 is assigned to logic. For example, it is described in a hardware description language so that these pins 55 are not assigned as input pins.

By using such printed circuit boards 14 and circuit description elements 17, 27, even if the circuit description elements 17, 27 are manufactured by different providers, they can be installed on the printed circuit boards 14 having a same circuit pattern thereon. Also, more than one circuit patterns corresponding to the circuit description elements 17, 27 manufactured by different providers may be formed at different positions on the printed circuit boards 14, so that they can be installed on the printed circuit boards 14 having same circuit patterns thereon even if the circuit description elements 17, 27 are manufactured by different providers.

As described above, the power range monitoring system 10 of this embodiment uses the circuit description elements 17, 27, 37, 47 manufactured by different providers for each diversity APRM unit 12, 22, 32, 42. Therefore, even if there is a cause of failure common to the circuit description elements manufactured by a certain provider, the cause of failure does not result in a malfunction of the power range monitoring system 10.

For another example, mutually different circuit description elements 17, 27, 37, 47 can be FPGA elements manufactured by a single provider and implemented mutually different VHDL designs by a single FPGA configuration tool described by different designers so that the electric circuit satisfies requirements. In this case, even if there is an error in a certain VHDL design, the error in the VHDL design does not result in a malfunction of the power range monitoring system 10.

For yet another example, mutually different circuit description elements 17, 27, 37, 47, can be FPGA elements manufactured by a single provider and implemented a single VHDL design described in the hardware description language that constitutes the electric circuit that satisfies the requirements by mutually different FPGA configuration tools. In this case, even if there is an error in a certain FPGA configuration tool, the error in a FPGA configuration tool does not result in a malfunction of power range monitoring system 10.

It can be verified whether mutually different circuit description elements 17, 27, 37, 47 constitute the electric circuit that satisfies the requirements or not, for example, by an FPGA Input/Output pattern comparing device.

Figure 4:
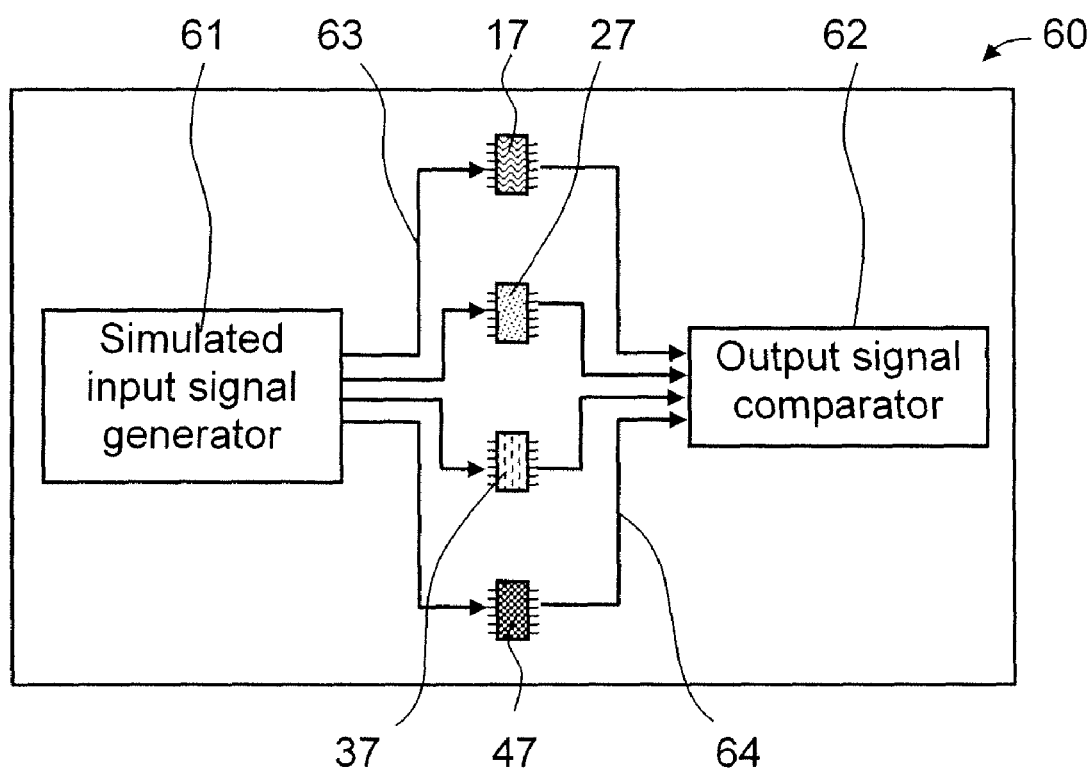
FIG. 4 is a block diagram of a FPGA Input/Output pattern comparing device of the first embodiment of the power range monitoring system according to the present invention.

FIG. 4 is a block diagram of the FPGA Input/Output pattern comparing device of the first embodiment of the power range monitoring system according to the present invention.

The FPGA Input/Output pattern comparing device 60 is provided with a simulated input signal generator 61 and an output signal comparator 62. The simulated input signal generator 61 outputs a simulated input signal 63 to target circuit description elements 17, 27, 37, 47 for validation. The simulated input signal 63 simulates the input signal to be processed by the target circuit description elements 17, 27, 37, 47. Output signals 64 outputted from the circuit description elements 17, 27, 37, 47 are inputted into the output signal comparator 62.

This FPGA Input/Output pattern comparing device 60 compares the voltage values of the output signals and the timings of their changes in response to the same input signals into a plurality of circuit description elements 17, 27, 37, 47. By this comparison, it can be judged whether the mutually different circuit description elements 17, 27, 37, 47 output the same output signals in response to the same input signals, and then those circuit description elements 17, 27, 37, 47 can be validated. Therefore, it can be judged whether a certain provider, a certain VHDL design, or a certain FPGA configuration tool has an error or not.

The output signal comparator 62 is, for example, connected to the electric output of the circuit description elements 17, 27, 37, 47 via resistors of the same resistance, and measures the voltage at the connect point. In case that the circuit description elements 17, 27, 37, 47 are four FPGA elements of which the output voltage is 0V or 5V for example, if all of the FPGA elements behave in the same manner, the voltage of the connect point must be 0V or 5V. However, if any of the FPGA elements behave differently from other FPGA element, the voltage of the connect point would be a value other than 0V or 5V. So it can be checked whether any of the FPGA has an error by comparing the voltage with thresholds.

In case the Input/Output patterns of each FPGA element are logged and compared with each other to check that they are in agreement, the number of Input/Output patterns to be logged would increase as the number of the FPGA elements increases. Also a circuit configuration would be complicated because the circuits for comparing each pattern are necessary. However, as mentioned above, even if the number of FPGA elements increases, by connecting the electric output of a plurality of FPGA elements at a single point and monitoring the output voltage at the connect point, a plurality of the FPGA elements can be validated only by monitoring the voltage of the connect point. Therefore, the circuit configuration for validation can be simple and the probability of failure of the circuit for validation can be reduced.

The output signal comparator 62 may have a majority decision processing function. The majority decision processing function is to compare the output signals of the FPGA elements in response to a single input signal, and to judge that FPGA elements outputting a majority signal are sound, and the other FPGA elements have a defect. Thus, t a plurality of the circuit description elements 17, 27, 37, 47 can be validated efficiently.

Although the FPGA Input/Output pattern comparing device 60 validates circuit description elements 17, 27, 37, 47 by comparing the output signals of circuit description elements 17, 27, 37, 47, the validation can be performed by comparing the output signals 64 from the LPRM modules 13, 23, 33, 43, the APRM modules 15, 25, 35, 45 or the whole APRM units 12, 22, 32, 42, in response to the simulated input signal 63. In this way, each module as a whole or each unit as a whole can also be validated.

As described above, a possibility of malfunction of the whole diversity system due to an error common to a plurality of the circuit description elements can be reduced by diversifying the channels with mutually different circuit description elements for each of the channels.

Second Embodiment

Figure 5:
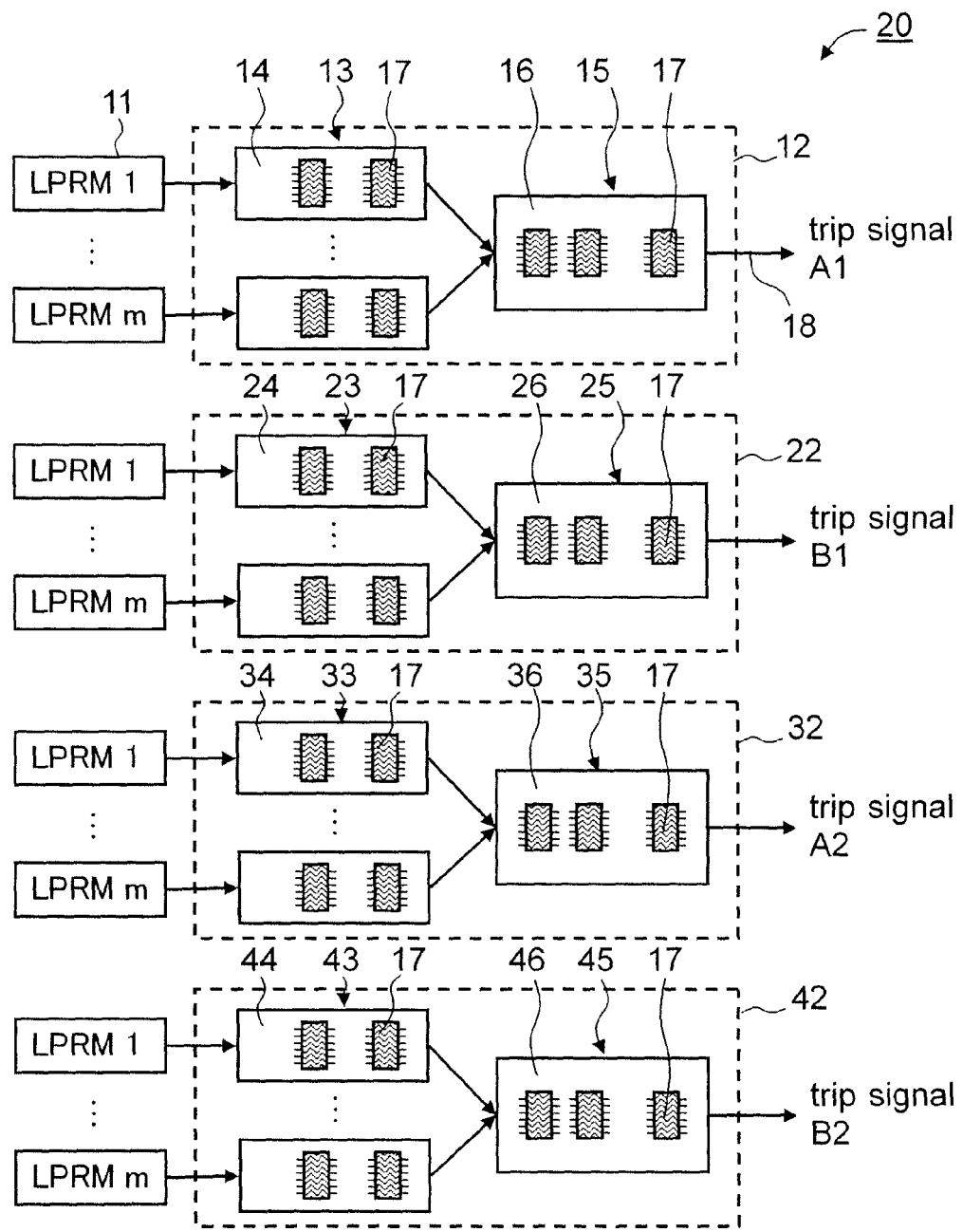
FIG. 5 is a block diagram in a second embodiment of the power range monitoring system according to the present invention.

FIG. 5 is a block diagram in a second embodiment of the power range monitoring system according to the present invention.

The power range monitoring system 20 of this embodiment is provided with mutually different printed circuit boards 14, 24, 34, 44 for each of the LPRM modules 13, 23, 33, 43. The circuit patterns of these printed circuit boards 14, 24, 34, 44 may be designed by different designers independently so as to satisfy the same requirements.

Mutually different printed circuit boards 16, 26, 36, 46 are also used for each of the APRM units 15, 25, 35, 45. The circuit patterns of these printed circuit boards 16, 26, 36, 46 may be designed by different designers independently so as to satisfy the same requirements.

All of the APRM units 12, 22, 32, 42 may be provided with the circuit description elements 17 that are the FPGA elements manufactured by a single provider and are implemented the same VHDL design by the single FPGA configuration tool, for example.

In this way, the power range monitoring system 20 of this embodiment is provided with the diversity APRM units 12, 22, 32, 42 different in the circuit patterns formed on the printed circuit boards 14, 24, 34, 44, 16, 26, 36, 46. Therefore, even if there is an error in a certain circuit pattern, the error does not result in malfunction of the power range monitoring system 20.

As described above, a possibility of malfunction of the whole diversity system due to an error common to a plurality of the printed circuit boards can be reduced by diversifying the channels with mutually different printed circuit boards.

Other Embodiments

Above-mentioned embodiments are just examples, and the present invention is not limited to these. For example, although the above-mentioned embodiments are explained with the safety protection instrumentation system as an example, it is applicable to other diversity systems. Also each feature of the embodiments can be combined.

What is claimed is:

1. A diversity signal processing system having diversity channels, each of the diversity channels having a unit designed so as to satisfy a requirement that a given output signal is outputted in response to a given input signal, the unit each comprising:
  a printed circuit board having a circuit pattern thereon; and
  a circuit description element installed on the printed circuit board, the circuit description element being implemented an electric circuit described in a hardware description language;
  wherein the diversity channels differ from each other in one of the circuit pattern of the channel and the circuit description element of the channel.

2. The diversity signal processing system according to claim 1, wherein the diversity channels differ from each other in a provider manufacturing the circuit description element of the channel.

3. The diversity signal processing system according to claim 1, wherein the diversity channels differ from each other in a description of the electric circuit implemented in the circuit description element of the channel.

4. The diversity signal processing system according to claim 1, wherein the diversity channels differ from each other in a configuration tool used for implementing the electric circuit into the circuit description element of the channel.

5. A method for producing a diversity signal processing system having diversity channels, each of the diversity channels having a unit designed so as to satisfy a requirement that a certain output signal is outputted in response to a certain input signal, the unit each having a printed circuit board and a circuit description element installed on the printed circuit board, the printed circuit board each having a circuit pattern thereon, the circuit description element each being implemented an electric circuit described in a hardware description language, the method comprising:
  generating the printed circuit board and the circuit description elements so that the diversity channels differ from each other in one of the circuit pattern and the circuit description elements; and
  installing the circuit description elements on the printed circuit board after the step of generating.

6. The method for producing a diversity signal processing system according to claim 5, wherein the step of generating includes making providers to manufacture the circuit description elements of the diversity channels, the providers for the diversity channels different from each other.

7. The method for producing a diversity signal processing system according to claim 5, wherein the step of generating includes implementing the electric circuits described as descriptions in the circuit description elements, the descriptions for the diversity channels different from each other.

8. The method for producing a diversity signal processing system according to claim 5, wherein the step of generating includes implementing the electric circuits in the circuit description elements by configuration tools, the configuration tools for the diversity channels different from each other.

9. The method for producing a diversity signal processing system according to claim 5, further comprising validating after the generating step and before the installing step, the validating step being for judging the circuit description element as valid if output signals are consistent each other, the output signals outputted by the circuit description elements of the diversity channels when a simulated input signals simulating the certain input signal are given to the circuit description elements.

10. The method for producing a diversity signal processing system according to claim 9, the validating step includes comparing a voltage at a connect point with a certain threshold, the connect point connected by outputs of all of the circuit description elements.

11. The method for producing a diversity signal processing system according to claim 9, the validating step includes judging the circuit description element outputting a majority signal as valid, the majority signal getting a majority of the output signals outputted in response to a single input signal.

* * * * *